US012809189B2

(12) United States Patent
Yang et al.

(10) Patent No.: US 12,809,189 B2
(45) Date of Patent: Nov. 24, 2026

(54) COLLIMATOR, MANUFACTURING METHOD THEREOF, AND DISPLAY DEVICE INCLUDING COLLIMATOR

(71) Applicant: SAMSUNG DISPLAY CO., LTD., Yongin-si (KR)

(72) Inventors: Yong Hoon Yang, Yongin-si (KR); Dong Kyun Seo, Yongin-si (KR); Hyun Young Jung, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 1239 days.

(21) Appl. No.: 17/721,716

(22) Filed: Apr. 15, 2022

(65) Prior Publication Data

US 2023/0079920 A1 Mar. 16, 2023

(30) Foreign Application Priority Data

Sep. 13, 2021 (KR) ........................ 10-2021-0121931

(51) Int. Cl.

| | |
|---|---|
| ***G02B 27/30*** | (2006.01) |
| ***G02B 1/04*** | (2006.01) |
| ***G02B 1/12*** | (2006.01) |
| ***G06F 3/041*** | (2006.01) |
| ***G06F 3/042*** | (2006.01) |

(52) U.S. Cl.

CPC ............... *G02B 27/30* (2013.01); *G02B 1/12* (2013.01); *G06F 3/0421* (2013.01); *G02B 1/04* (2013.01); *G06F 3/0412* (2013.01)

(58) Field of Classification Search

CPC ......... G02B 27/30; G02B 1/12; G06F 3/0421; G06F 3/0412

USPC .......................................................... 359/641

See application file for complete search history.

(56) References Cited

U.S. PATENT DOCUMENTS

| | | | | |
|---|---|---|---|---|
| 4,082,907 | A * | 4/1978 | Schardein | F24S 70/25 428/651 |
| 10,664,680 | B2 | 5/2020 | Xu et al. | |
| 11,894,470 | B2 | 2/2024 | Lee et al. | |
| 2019/0347462 | A1* | 11/2019 | Tseng | G06V 40/1324 |
| 2020/0065545 | A1* | 2/2020 | Ahn | G06V 40/1318 |
| 2022/0043995 | A1 | 2/2022 | Song et al. | |
| 2022/0320170 | A1* | 10/2022 | Hai | H10F 39/8057 |

FOREIGN PATENT DOCUMENTS

| | | | | |
|---|---|---|---|---|
| CN | 107556938 | A * | 1/2018 | |
| CN | 111191491 | A * | 5/2020 | G06V 40/1318 |
| CN | 112861566 | | 5/2021 | |
| CN | 112861566 | A * | 5/2021 | G06V 40/1324 |
| JP | 11-119007 | | 4/1999 | |
| JP | 2002-048907 | | 2/2002 | |

(Continued)

OTHER PUBLICATIONS

Translation of CN_112861566_A (Year: 2025).*
Translation of CN_107556938_A (Year: 2026).*
Translation of CN_111191491_A (Year: 2026).*

*Primary Examiner* — Jerry L Brooks

(74) *Attorney, Agent, or Firm* — F. CHAU & ASSOCIATES, LLC

(57) ABSTRACT

A collimator includes: a transmission pattern transmitting light; and a non-transmission layer disposed on at least one side surface of the transmission pattern. The non-transmission layer includes a low reflective metal material.

20 Claims, 12 Drawing Sheets

(56) References Cited

FOREIGN PATENT DOCUMENTS

| | | |
|---|---|---|
| JP | 2015-179788 | 10/2015 |
| KR | 10-2021-0069778 A | 6/2021 |
| KR | 10-2022-0019123 | 2/2022 |

* cited by examiner

COLLIMATOR, MANUFACTURING METHOD THEREOF, AND DISPLAY DEVICE INCLUDING COLLIMATOR

CROSS-REFERENCE TO RELATED APPLICATION

The present application claims priority under 35 U.S.C. § 119(a) to Korean patent application 10-2021-0121931 filed on Sep. 13, 2021 in the Korean Intellectual Property Office, the disclosure of which is incorporated by reference herein in its entirety.

TECHNICAL FIELD

The present invention generally relates to a collimator, a manufacturing method of the collimator, and a display device including the collimator.

DISCUSSION OF THE RELATED ART

With the development of information technologies, the importance of a display device, which may function as a connection medium between a user and information, increases. Accordingly, display devices such as a liquid crystal display device and an organic light emitting display device are increasingly used.

Generally, a display device may include a display panel and a sensing panel. The display panel may be for displaying an image, and the sensing panel may be for acquiring sensing information on an input of a user. For example, the display device may include a fingerprint sensor for acquiring information of a fingerprint of the user. In addition, the fingerprint sensor may include a collimator to secure the information of the fingerprint of the user.

SUMMARY

According to an embodiment of the present invention, a collimator includes: a transmission pattern transmitting light; and a non-transmission layer disposed on at least one side surface of the transmission pattern. The non-transmission layer includes a low reflective metal material.

In an embodiment of the present invention, the collimator includes a transmission area and a non-transmission area. The transmission pattern overlaps with the transmission area, and does not overlap with the non-transmission area.

In an embodiment of the present invention, the non-transmission layer does not overlap with the transmission area, and overlaps with the non-transmission area.

In an embodiment of the present invention, the collimator further includes a lower substrate on which the transmission pattern and the non-transmission layer are disposed, wherein the lower substrate and the non-transmission layer are in contact with each other in the non-transmission area.

In an embodiment of the present invention, the transmission pattern includes a transparent organic material.

In an embodiment of the present invention, the non-transmission layer has a reflexibility of about 20% or less.

In an embodiment of the present invention, the non-transmission layer includes at least one of molybdenum tantalum oxide or molybdenum oxide.

According to an embodiment of the present invention, a method of manufacturing a collimator includes: disposing a base transmission layer on a lower substrate; disposing a transmission layer on the base transmission layer; forming a transmission pattern by etching at least a portion of the base transmission layer by using the transmission layer as a first etching mask; disposing a base non-transmission layer on the lower substrate; and forming a non-transmission layer by etching at least a portion of the base non-transmission layer. The non-transmission layer includes a low reflective metal material.

In an embodiment of the present invention, the transmission layer overlaps with a position at which the transmission pattern is formed.

In an embodiment of the present invention, the forming of the transmission pattern includes exposing at least one side surface of the transmission pattern.

In an embodiment of the present invention, the forming of the non-transmission layer includes: providing a photoresist layer on the lower substrate; and patterning the photoresist layer to form a second etching mask for etching the base non-transmission layer, and wherein the etching of the at least a portion of the base non-transmission layer is performed by using the second etching mask.

In an embodiment of the present invention, the forming of the non-transmission layer includes exposing at least one surface of the transmission layer.

In an embodiment of the present invention, the patterning of the photoresist layer includes removing a first portion of the photoresist layer without removing a second portion of the photoresist layer, wherein the second portion of the photoresist layer is a remaining photoresist layer, and wherein the remaining photoresist layer covers at least one side surface of the transmission pattern.

In an embodiment of the present invention, the forming of the non-transmission layer includes providing a transmission area and a non-transmission area, wherein the transmission area overlaps with the transmission pattern, and wherein the non-transmission area overlaps with the non-transmission layer.

In an embodiment of the present invention, the non-transmission layer includes at least one of molybdenum tantalum oxide and/or molybdenum oxide.

In an embodiment of the present invention, the method further includes removing the transmission layer.

According to an embodiment of the present invention, a display device includes: a fingerprint sensing panel acquiring fingerprint information of a user's touch input; and a display panel including a light emitting element emitting light. The fingerprint sensing panel includes: a collimator layer including a transmission pattern and a non-transmission layer, wherein the transmission pattern provides an optical path for light to be transmitted through, and the non-transmission layer is configured to not transmit light; and a sensor layer including sensors sensing light passing through the collimator layer. The non-transmission layer includes a low reflective metal material.

In an embodiment of the present invention, the user's touch input is provided on a first surface of the display panel, and wherein the fingerprint sensing panel is disposed on a second surface of the display panel, and the collimator layer is disposed between the display panel and the sensor layer.

In an embodiment of the present invention, the optical path provides a path for light proceeding to the sensor layer.

In an embodiment of the present invention, a display device includes: a fingerprint sensing panel, wherein the fingerprint sensing panel includes: a collimator manufactured by the method of claim 8; and a sensor layer acquiring information based on received light passing through the collimator.

BRIEF DESCRIPTION OF THE DRAWINGS

The above and other features of the present invention will become more apparent by describing in further detail embodiments thereof with reference to the accompanying drawings, in which.

DETAILED DESCRIPTION OF THE EMBODIMENTS

Figure 1:
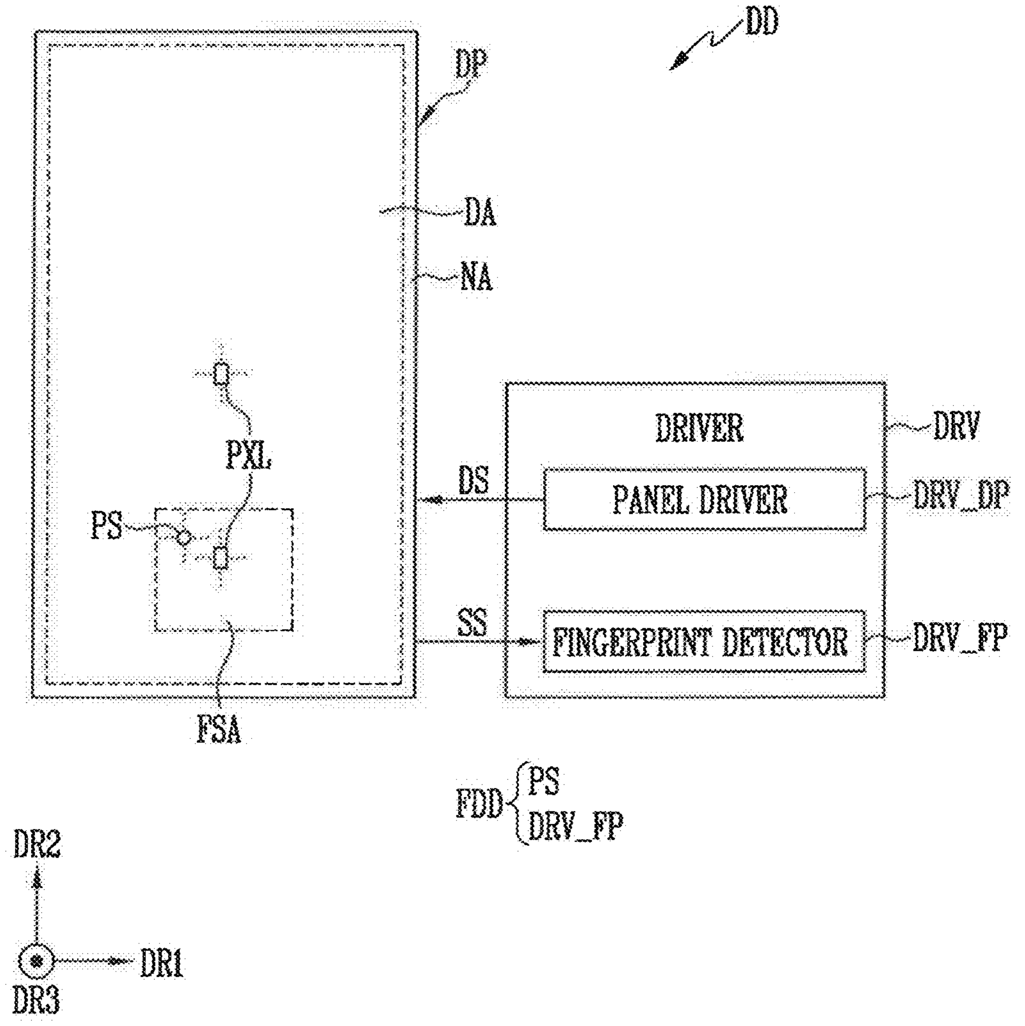
FIG. 1 is a block diagram schematically illustrating a display device in accordance with an embodiment of the present invention.

Embodiments will now be described more fully hereinafter with reference to the accompanying drawings; however, they may be embodied in different forms and should not be construed as limited to the embodiments set forth herein.

In the drawings, various thicknesses, lengths, and angles are shown and while the arrangement shown does indeed represent an embodiment of the present disclosure, it is to be understood that modifications of the various thicknesses, lengths, and angles may be possible within the spirit and scope of the present disclosure and the present disclosure is not necessarily limited to the particular thicknesses, lengths, and angles shown. It will be understood that when an element is referred to as being "between" two elements, it can be the only element between the two elements, or one or more intervening elements may also be present. In the drawings, like reference numerals may refer to like elements throughout the specification, and thus, their descriptions may be omitted.

Embodiments of the present invention disclosed in the present specification are provided only for illustrative purposes.

The drawings attached to the present specification are provided to explain the present invention, and the shapes shown in the drawings may be exaggerated for clarity, and thus the present invention is not limited thereto.

The present invention generally relates a collimator, a manufacturing method thereof, and a display device including a collimator. Hereinafter, a collimator, a manufacturing method thereof, and a display device including the collimator in accordance with an embodiment of the present invention will be described with reference to the accompanying drawings.

FIG. 1 is a block diagram schematically illustrating a display device in accordance with an embodiment of the present invention.

The display device DD is configured to emit light.

Referring to FIG. 1, the display device DD may include a display panel DP and a driver DRV. The driver DRV may include a panel driver DRV_DP and a fingerprint detector DRV_FP (or, e.g., fingerprint authentication unit)

For convenience of description, a case where the display panel DP and the driver DRV are separated from each other is illustrated in FIG. 1, but the present invention is not limited thereto. For example, the whole or a portion of the driver DRV may be integrally implemented on the display panel DP.

The display panel DP may include a display area DA and a non-display area NA. The display area DA is an area in which a plurality of pixels PXL (which may be referred to as sub-pixels) are provided, and may be referred to as an active area. The display device DD drives the pixels PXL, corresponding to image data input from the outside or an external device, thereby displaying an image in the display area DA.

The pixels PXL may be disposed in the display area DA. Each pixel PXL may include a light emitting element (see 'LD' shown in FIG. 6). In an example, the pixels PXL may be arranged according to a stripe arrangement structure, a PENTIL™ arrangement structure, matrix arrangement, or the like. However, the present invention is not limited thereto, and the pixels PXL may be arranged according to various structures known in the art.

In accordance with an embodiment of the present invention, the display area DA may include a fingerprint sensing area FSA. The display area DA and the fingerprint sensing area FSA may overlap with each other in a plan view. The fingerprint sensing area FSA may overlap with at least one of the pixels PXL.

In addition, although an example in which only one fingerprint sensing area FSA is formed in the display area AA is illustrated in FIG. 1, the present invention is not limited thereto. For example, a plurality of fingerprint sensing areas FSA arranged regularly or irregularly may be formed in the display area DA.

The non-display area NA is an area disposed at the periphery of the display area DA, and may be referred to as a non-active area. For example, the non-display area NA may at least partially surround the display area DA. For example, the non-display area NA may include a line area, a pad area, various dummy areas, and the like.

In accordance with an embodiment of the present invention, the display device DD may include a fingerprint authentication device FDD. The fingerprint authentication device FDD may include sensors PS and the fingerprint detector DRV_FP.

For example, the sensors PS may be a photo sensor configured to sense light. When light provided (e.g., emitted or diffused) from a light source (e.g., the pixel PXL or the light emitting element LD), which is provided in the display device DD, is reflected by a finger of a user, the sensors PS may sense the reflected light and provide (or output) an electrical signal (e.g., a voltage signal) corresponding to the sensed light. For example, each sensor PS may be referred to as a sensor pixel. For example, the sensors PS may be one of a photo diode, a CMOS image sensor, and a CCD camera. However, the sensor PS is not necessarily limited to a specific example.

In accordance with an embodiment of the present invention, an electrical signal provided from each of the sensors PS may constitute one point (e.g., a point of brightness/darkness as a minimum unit constituting a fingerprint image) in the fingerprint image.

In accordance with an embodiment of the present invention, reflected lights incident onto each of the sensors PS may have different optical characteristics (e.g., a frequency, a wavelength, an intensity, etc.) according to whether the reflected lights are reflected by valleys or ridges of a fingerprint (e.g., of a palm pattern, or a skin pattern) formed on the finger (e.g., the palm or skin) of the user. Therefore, the sensors PS may output sensing signals SS having different electrical characteristics, corresponding to the optical characteristics of the reflected lights.

The sensors PS may be disposed on the fingerprint sensing area FSA. For example, the sensors PS may overlap with the pixels PXL in a plan view, or may be disposed at the periphery of the pixels PXL. In an example, some sensors PS may overlap some pixels PXL, while other sensors PS may be disposed at the periphery of other pixels PXL. For example, some or all of the sensors PS may overlap with the pixels PXL, or be disposed between the pixels PXL. In an embodiment of the present invention, the sensors PS and the pixels PXL may have the same size or have different sizes from each other.

When the sensors PS are disposed adjacent to the pixels PXL or overlap with at least a portion of each of the pixels PXL, the sensors PS may use, as light sources, light emitting elements LD provided in the pixels PXL. In this embodiment, the sensors PS along with the light emitting elements LD provided in the pixels PXL may constitute a photosensitive type of fingerprint sensor. As described above, when a display device having a built-in fingerprint sensor is configured by using the pixels PXL as light sources, without any external light source, the module thickness of the photosensitive type of fingerprint sensor and the display device having the photosensitive type of fingerprint sensor can be decreased, and manufacturing cost can be reduced.

The sensors PS may be arranged on the other surface (e.g., a rear surface) facing one surface (e.g., a front surface), on which an image is displayed, of the display panel DR For example, the sensors PS may be arranged between both surfaces of the display panel DP. However, the present invention is not limited thereto. For example, the sensors PS may be disposed more adjacent to the front surface of the display panel DP than the pixels PXL emitting light.

Hereinafter, for convenience of description, an embodiment in which the sensors PS are disposed on the rear surface of the display panel DP will be mainly described.

The driver DRV may drive the display panel DR For example, the driver DRV may output a data signal DS corresponding to image data to the display panel DP. In addition, the driver DRV may output a driving signal for the sensor PS and receive electrical signals (e.g., a sensing signal SS) received from the sensor PS. The driver DRV may detect a fingerprint shape of the user by using the electrical signals output from the sensor PS.

In an exemplary embodiment of the present inventive concept, the driver DRV may include the panel driver DRV_DP and the fingerprint detector DRV_FP. Each of the panel driver DRV_DP and the fingerprint detector DRV_FP may be implemented as an integrated circuit, and, for example, may be mounted in a flexible circuit board. For example, the panel driver DRV_DP may be connected to the display panel DP through the flexible circuit board, and the fingerprint detector DRV_FP may be connected to the sensors PS. Although a case where the panel driver DRV_DP and the fingerprint detector DRV_FP are separated from each other is illustrated in FIG. 1, the present invention is not limited thereto. For example, at least a portion of the fingerprint detector DRV_FP may be integrated with the panel driver DRV_DP, or operate in connection with the panel driver DRV_DP.

The panel driver DRV_DP may supply a data signal DS, corresponding to image data, to the pixels PXL while sequentially scanning the pixels PXL of the display area DA. In addition, the display panel DP may display an image corresponding to the image data.

The fingerprint detector DRV_FP may detect or recognize a fingerprint, based on the sensing signal SS provided from the sensors PS. For example, the fingerprint detector DRV_FP may convert the sensing signal SS into a fingerprint image (or fingerprint image data), and perform fingerprint authentication, based on the fingerprint image. The sensors PS and the fingerprint detector DRV_FP may form (or, e.g., constitute) the fingerprint authentication device FDD (or, e.g., fingerprint sensing device).

A fingerprint is includes ridges and valleys, which form windings on a surface of a fingerprint. A fingerprint image is an expression of these ridges and valleys. In the fingerprint image, the ridges may be ordinarily expressed as dark lines, and the valleys between the ridges may be expressed as being relatively bright.

Hereinafter, a stacked structure of the display device DD in accordance with an embodiment of the present invention will be described with reference to FIG. 2.

Figure 2:
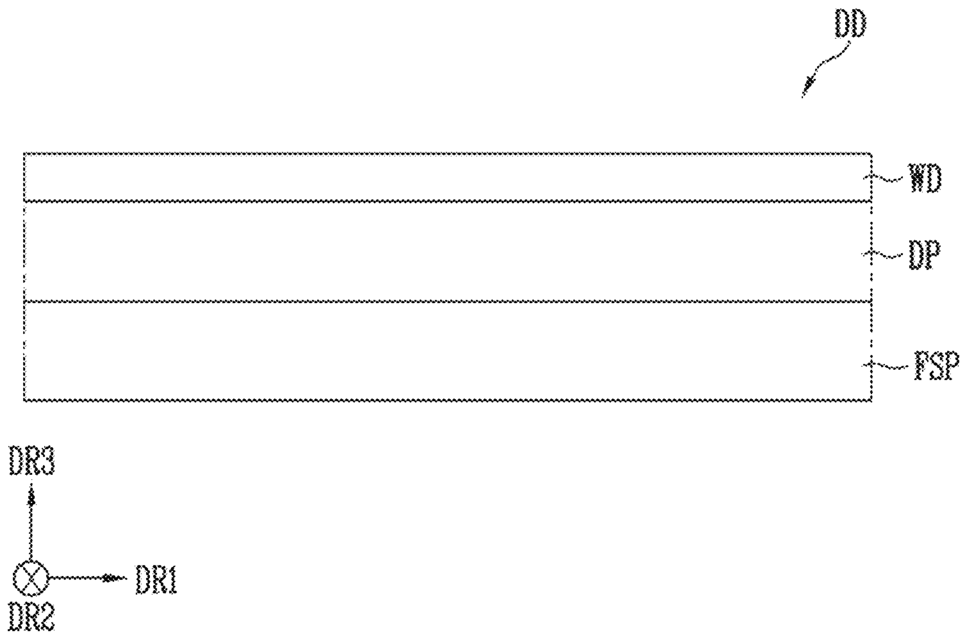
FIG. 2 is a sectional view schematically illustrating a display device in accordance with an embodiment of the present invention.

FIG. 2 is a sectional view schematically illustrating a display device in accordance with an embodiment of the present invention.

Referring to FIG. 2, the display device DD may include a fingerprint sensing panel FSP, a display panel DP, and a window WD.

The fingerprint sensing panel FSP may be disposed on the display panel DR For example, the fingerprint sensing panel FSP may be disposed on a rear surface of the display panel DP (e.g., the other surface of the display panel DP). The fingerprint sensing panel FSP may acquire information (e.g., an electrical signal) on a position of a fingerprint according to a user's touch input. In accordance with an embodiment of the present invention, the fingerprint sensing panel FSP may include sensors FSR For example, the sensors PS may be photo sensors driven optically. In accordance with an embodiment of the present invention, the user input (e.g., a user's touch input) may be provided on one surface of the display device DD (e.g., one surface of the display panel DP).

The display panel DP may be disposed on the fingerprint sensing panel FSP. The display panel DP may emit light. The display panel DP may provide light in a display direction of the display device DD (e.g., a third direction DR3). For example, the display panel DP may emit light in the direction towards the window WD. The light provided from the display panel DP may be reflected by a fingerprint of a user and then be provided to the fingerprint sensing panel FSP. In the present invention, the kind of the display panel DP is not particularly limited. For example, the display panel DP may be implemented as a self-luminescent display panel such as an organic light emitting display panel. However, when the display panel DP is implemented as a self-luminescent display panel, each pixel is not necessarily limited to a case where the pixel includes only an organic light emitting element. For example, a light emitting element of each pixel may be configured as an organic light emitting diode, an inorganic light emitting diode, a quantum dot/well light emitting diode, etc. A plurality of light emitting elements may be provided in each pixel. The plurality of light emitting elements may be connected in series, parallel, series/parallel, etc. In addition, the display panel DP may be implemented as a non-light emitting display panel such as a liquid crystal display panel. When the display panel DP is implemented as a non-light emitting display panel, the display device DD may additionally include a light source such as a back-light unit.

Hereinafter, as an example, an embodiment in which the display panel DP is implemented as an organic light emitting display panel will be mainly described.

The window WD may be disposed on the display panel DR For example, the window WD may be disposed on the top surface of the display panel DR The window WD is a protective member for protecting the display device DD from external impact, etc., and may be a transparent light transmission substrate. The window WD may include, for example, a glass substrate, a base film including a synthetic resin film and the like, a light blocking pattern, a functional coating layer, and the like. The base film may be configured with a single layer or a plurality of layers. In an embodiment of the present inventive concept, an adhesive layer may be located between the display panel DP and the window WD. The adhesive layer may include an optically transparent adhesive member.

Figure 3:
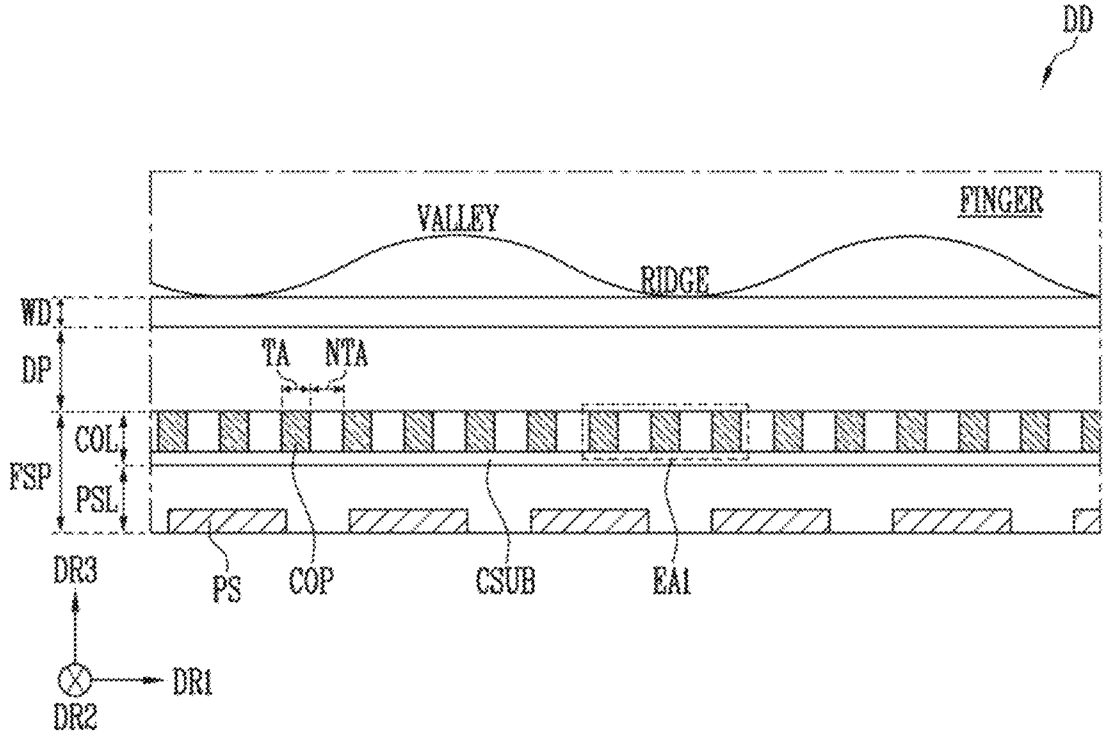
FIG. 3 is a sectional view illustrating an example of a display device in accordance with an embodiment of the present invention, and is a sectional view mainly illustrating a fingerprint sensing panel.

FIG. 3 is a sectional view illustrating an example of a display device in accordance with an embodiment of the present invention, and is a sectional view mainly illustrating a fingerprint sensing panel. Descriptions of portions overlapping with those described above will be simplified or omitted to prevent redundant descriptions.

Referring to FIG. 3, a fingerprint sensing panel FSP may be formed on a bottom surface of the display device DD. The fingerprint sensing panel FSP may be disposed on a rear surface (or, e.g., bottom surface) of a display panel DP to overlap with at least a portion of the display panel DR For example, the fingerprint sensing panel FSP may be coupled to the rear surface of the display panel DP by a predetermined adhesive or the like.

The fingerprint sensing panel FSP may include a sensor layer PSL and a collimator COL. The collimator COL may be designated as a collimator layer.

The sensor layer PSL may include a plurality of sensors PS. The sensors PS may be disposed at predetermined distances from one another. The sensors PS may be configured to receive lights reflected along valleys and/or ridges of a fingerprint formed on a finger of a user.

The collimator COL may be disposed between the sensor layer PSL and the display panel DP. For example, one surface of the collimator COL may be in contact with the display panel DP, and the other surface of the collimator COL may be in contact with the sensor layer PSL.

The collimator COL may form a path for light proceeding to the sensor layer PSL. The collimator COL is a component for increasing the sensing precision of the fingerprint sensing panel FSP, and for concentrating light reflected by the fingerprint of the user on the sensor layer PSL. The collimator COL may increase the concentration rate of light provided to the sensor layer PSL.

In an embodiment of the present invention, a protective layer for protecting the display device DD from external influence, impurities and/or external force may be disposed between the collimator COL and the display panel DR For example, the protective layer may be disposed on a rear surface of a base layer (see 'BSL' shown in FIG. 6) of the display panel DP. For example, the protective layer may be provided in a film form, to ensure flexibility of the display device DD. In an example, the protective layer and the fingerprint sensing panel FSP may be coupled to each other by a transparent adhesive such as an OCA. The protective layer and the fingerprint sensing panel FSP may be coupled to each other by a pressure sensitive adhesive.

In addition, the collimator COL may include a collimating pattern COP. The collimating pattern COP will be described in detail in conjunction with FIGS. 4 and 5.

Figure 4:
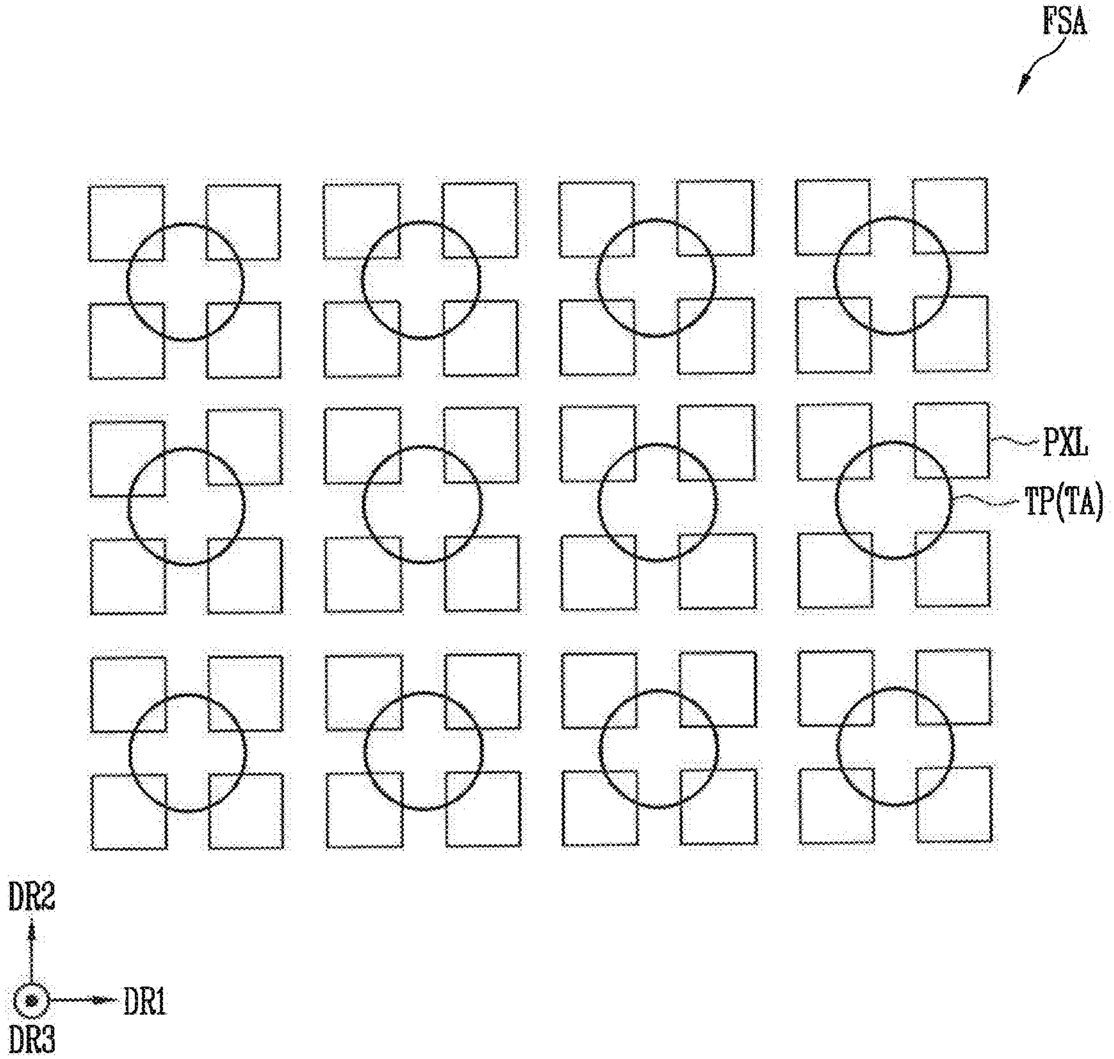
FIG. 4 is a schematic plan view illustrating a position relationship between a transmission pattern and a pixel in accordance with an embodiment of the present invention.
Figure 5:
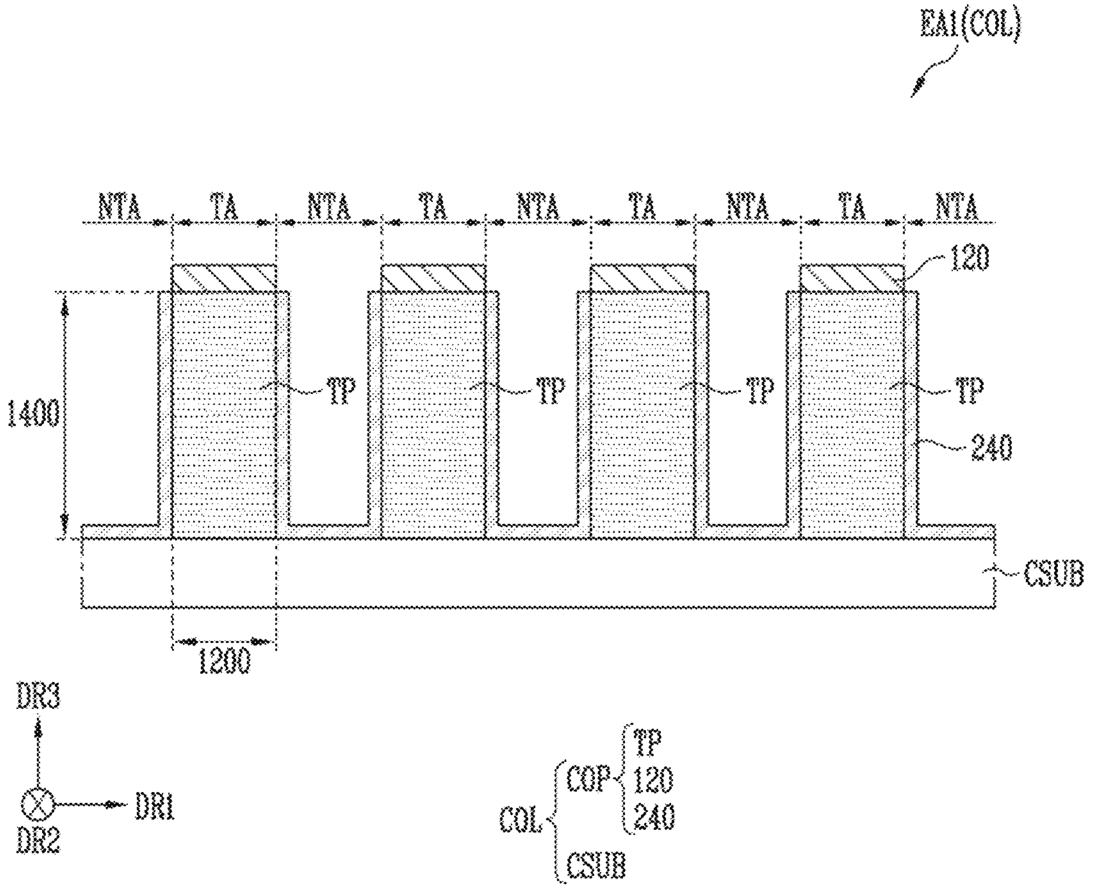
FIG. 5 is an enlarged view of area EA1 shown in FIG. 3, and is a schematic sectional view illustrating a collimating pattern in accordance with an embodiment of the present invention.

FIG. 4 is a schematic plan view illustrating a positional relationship between a transmission pattern and a pixel in accordance with an embodiment of the present invention. FIG. 5 is an enlarged view of area EA1 shown in FIG. 3, and is a schematic sectional view illustrating a collimating pattern in accordance with an embodiment of the present invention.

Further referring to FIGS. 4 and 5, the collimator COL may include a collimating pattern COP and a lower substrate CSUB. The collimating pattern COP may include a transmission pattern TP, a transmission layer 120, and a non-transmission layer 240.

The lower substrate CSUB may provide an area in which the transmission pattern TP, the transmission layer 120, and the non-transmission layer 240 are disposed. The lower substrate CSUB may form (or constitute) a base surface of the collimating pattern COP. The lower substrate CSUB may be a rigid or flexible base member (e.g., a substrate or film), but the present invention is not limited to a specific example. The lower substrate CSUB may be a stack substrate on which predetermined materials can be stacked to form components of the collimating pattern COP.

In accordance with an embodiment of the present invention, the lower substrate CSUB may include a material known in the art, which has light transmissivity. Accordingly, light reflected from a fingerprint of a user may be provided to the sensor layer PSL while passing through the transmission pattern TP and the lower substrate CSUB.

The transmission pattern PT is configured to allow light to be transmitted therethrough. For example, the transmission pattern TP may include a transparent material. In another example, the transmission pattern TP may include a plurality of openings. In accordance with an embodiment of the present invention, the transmission pattern TP may include a transparent organic material. The transmission pattern TP may include at least one of acrylate monomer, phenylacetylene, diamine, dianhydride, siloxane, silane, parylene, olefin-based polymer (e.g., polyethylene or polypropylene), polyethylene terephthalate, fluorine resin, and/or polysiloxane. However, the transmission pattern TP is not necessarily limited to a specific example.

In accordance with an embodiment of the present invention, the collimating pattern COP (or the collimator COL) may include a transmission area TA and a non-transmission area NTA.

The transmission pattern TP may be disposed in the transmission area TA. The transmission pattern TP may form the transmission area TA. An area in which the transmission pattern TP is disposed may be the transmission area TA. The transmission pattern TP and the transmission area TA may overlap with each other in a plan view. Light may be transmitted in the transmission area TA.

The transmission pattern TP might not be disposed in the non-transmission area NTA. In accordance with an embodiment of the present invention, the non-transmission area NTA may be defined by the transmission pattern TP and the non-transmission layer 240. The non-transmission area NTA is an area in which the transmission pattern TP is not disposed, and may be an area in which the non-transmission layer 240 is disposed. The non-transmission area NTA and the non-transmission layer 240 may overlap with each other in a plan view. The non-transmission area NTA and the transmission pattern TP might not overlap with each other in a plan view. Light might not be substantially transmitted in the non-transmission area NTA.

The transmission pattern TP may have a shape extending in one direction (e.g., the third direction DR3). The transmission pattern TP may have an aspect ratio of 1 or more. For example, a length by which the transmission pattern TP extends in the third direction DR3 may be longer than that by which the transmission pattern TP extends in another direction (e.g., a first direction DR1 or a second direction DR2) different from the third direction DR3.

In accordance with an embodiment of the present invention, the transmission pattern TP may overlap with pixels PXL in a plan view (see FIG. 4). For example, a portion of the transmission pattern TP may overlap with one of adjacent pixels PXL, and another portion of the transmission pattern TP may overlap with another of the adjacent pixels PXL. However, the transmission pattern TP is not limited to the above-described example. In an embodiment of the present invention, a portion of the transmission pattern TP might not overlap with any pixel PXL. For example, the transmission pattern TR may overlap an area between the pixels PXL.

In accordance with an embodiment of the present invention, a width 1200 and a height 1400 of the transmission pattern TP may be determined by considering the precision and light conversion efficiency of fingerprint sensing. In accordance with an embodiment of the present invention, the width 1200 of the transmission pattern TP may be smaller than the height 1400 of the transmission pattern TP. For example, the height 1400 of the transmission pattern TP may be about 10 μm or less. In an embodiment of the present invention, the height 1400 of the transmission pattern TP may be about 7 μm or less. For example, the width 1200 of the transmission pattern TP may be about 5 μm or less.

In accordance with an embodiment of the present invention, the transmission pattern TP may be provided in plurality to form a plurality of optical paths. For example, the optical paths may be paths for light proceeding to the sensor layer PSL (see FIG. 3). The transmission pattern TP may form an optical hole. Light reflected from the fingerprint of the user may travel through the optical hole formed by the transmission pattern TP. The transmission pattern TP may be disposed on a path through which the light reflected from the fingerprint of the user travels.

The non-transmission layer 240 may disposed on a side surface of the transmission pattern TP. At least a portion of the non-transmission layer 240 may be disposed on the lower substrate CSUB on which the transmission pattern TP is not disposed. Accordingly, the non-transmission layer 240 may include a first non-transmission layer disposed on the side surface of the transmission pattern TP and a second non-transmission layer disposed on the lower substrate CSUB, in an area in which the transmission pattern TP is not disposed. In accordance with an embodiment of the present invention, the non-transmission layer 240 and the lower substrate CSUB may be in contact with each other in the non-transmission area NTA. However, the present invention is not limited thereto.

The non-transmission layer 240 might not allow light to be substantially transmitted therethrough. For example, the non-transmission layer 240 may include a low reflective material. For example, the non-transmission layer 240 may include a low reflective metal material. The non-transmission layer 240 may have a reflexibility of about 20% or less. In an example, the non-transmission layer 240 may include one of molybdenum Tantalum Oxide (MTO) or Molybdenum Oxide (MO). However, the material included in the non-transmission layer 240 is not necessarily limited to a specific example. In accordance with an embodiment of the present invention, the non-transmission layer 240 may include a low reflective material (e.g., a low reflective metal material), to prevent distortion of an optical characteristic (e.g., a wavelength or the like) including information of a fingerprint due to light reflection while defining the non-transmission area NTA.

The non-transmission layer 240 may form or provide the non-transmission area NTA, to allow reflected light with respect to a user's fingerprint to be selectively provided to the sensor layer PSL through the transmission area TA. For example, the reflected light with respect to the user's fingerprint may include a first light provided to the non-transmission area NTA and a second light provided to the transmission area TA. The second light may be provided to the sensors PS of the sensor layer PSL, and the first light might not be provided to the sensors PS.

The transmission layer 120 may allow light to be transmitted therethrough. For example, the transmission layer 120 may include a transparent material. For example, the transmission layer 120 may be a mask used in an etching process of the transmission pattern TP. In an example, the transmission layer 120 may include at least one of Indium Tin Oxide (ITO), Indium Zinc Oxide (IZO), and/or Indium Tin Zinc Oxide (ITZO), but the present invention is not limited to a specific example.

One surface of the transmission layer 120 may be in contact with the transmission pattern TP. For example, the transmission layer 120 may be formed on an upper surface of each transmission pattern TP.

The transmission layer 120 may overlap with the transmission pattern TP in a plan view. The transmission layer 120 may be disposed in the transmission area TA. The transmission layer 120 may overlap with the transmission area TA in a plan view.

However, in an embodiment of the present invention, the transmission layer 120 may be removed, not to be disposed on the transmission pattern TP. The upper surface of each transmission pattern TP may not be covered by the transmission layer 120. However, similarly, the transmission pattern TP may be configured to allow light to be transmitted therethrough, thereby providing the transmission area TA.

Figure 6:
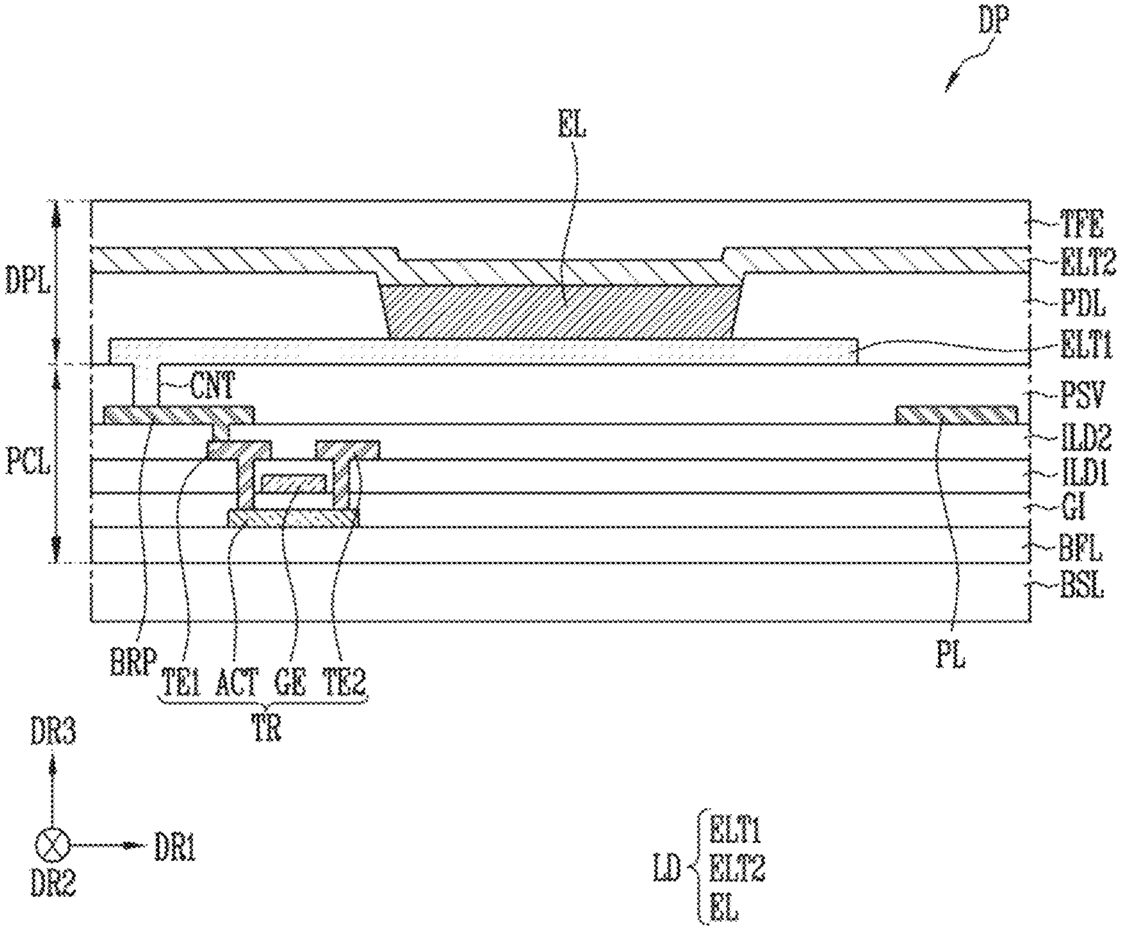
FIG. 6 is a sectional view schematically illustrating a display panel in accordance with an embodiment of the present invention.

In addition, a sectional structure of the display panel DP will be described with reference to FIG. 6. FIG. 6 is a sectional view schematically illustrating a display panel in accordance with an embodiment of the present invention. FIG. 6 is an embodiment in which the display panel DP is provided as an organic light emitting display panel, and schematically illustrates a sectional structure of any one of the pixels PXL.

Referring to FIG. 6, the display panel DP may include a base layer BSL, a pixel circuit layer PCL, and a display element layer DPL.

The base layer BSL may provide an area in which the pixel circuit layer PCL and the display element layer DPL are disposed. The base layer BSL may form (or constitute) a base member of the pixel PXL. The base layer BSL may be a rigid or flexible substrate or film, but present invention is not limited to a specific example.

The pixel circuit layer PCL may be provided on the base layer BSL. The pixel circuit layer PCL may include a buffer layer BFL, a transistor TR, a gate insulating layer GI, a first interlayer insulating layer ILD1, a second interlayer insulating layer ILD2, a bridge pattern BRP, a power line PL, a protective layer PSV, and a contact part CNT.

The buffer layer BFL may be located on the base layer BSL. The buffer layer BFL may prevent an impurity from being diffused from the outside. For example, the buffer layer BFL may include at least one of silicon nitride ($SiN_x$), silicon oxide ($SiO_x$), silicon oxynitride ($SiO_xN_y$), and/or a metal oxide such as aluminum oxide ($AlO_x$).

The transistor TR may be a thin film transistor. In accordance with an embodiment of the present invention, the transistor TR may be a driving transistor.

The transistor TR may be electrically connected to a light emitting element LD. The transistor TR may be electrically connected to the bridge pattern BRP.

The transistor TR may include an active layer ACT, a first transistor electrode TE1, a second transistor electrode TE2, and a gate electrode GE.

The active pattern ACT may include a semiconductor layer. The active layer ACT may be disposed on the buffer layer BFL. For example, the active layer ACT may include at least one of poly-silicon, Low Temperature Polycrystalline Silicon (LTPS), amorphous silicon, and an oxide semiconductor.

The active pattern ACT may include a first contact region and a second contact region. The first contact region may be in contact with the first transistor electrode TE1, and the second contact region may be in contact with the second transistor electrode TE2. The first contact region and the second contact region may respectively correspond to portions of a semiconductor pattern doped with an impurity. A region between the first contact region and the second contact region may be a channel region. The channel region may correspond to an intrinsic semiconductor pattern undoped with the impurity.

The gate electrode GE may be disposed on the gate insulating layer GI. A position of the gate electrode GE may correspond to the channel region of the active pattern ACT. For example, the gate electrode GE may be disposed on the channel region of the active pattern ACT with the gate insulating layer GI interposed therebetween.

The gate insulating layer GI may be disposed over the active pattern ACT. The gate insulating layer GI may include an inorganic material. In an example, the gate insulating layer GI may include at least one of silicon nitride ($SiN_x$), silicon oxide ($SiO_x$), silicon oxynitride ($SiO_xN_y$), and/or aluminum oxide ($AlO_x$).

The first interlayer insulating layer ILD1 may be located over the gate electrode GE and on the gate insulating layer GI. Like the gate insulating layer GI, the first interlayer insulating layer ILD1 may include, for example, at least one of silicon nitride ($SiN_x$), silicon oxide ($SiO_x$), silicon oxynitride ($SiO_xN_y$), and/or aluminum oxide ($AlO_x$).

The first transistor electrode TE1 and the second transistor electrode TE2 may be located on the first interlayer insulating layer ILD1. The first transistor electrode TE1 may be in contact with the first contact region of the active pattern ACT while penetrating the gate insulating layer GI and the first interlayer insulating layer ILD1, and the second transistor electrode TE2 may be in contact with the second contact region of the active pattern ACT while penetrating the gate insulating layer GI and the first interlayer insulating layer ILD1. In an example, the first transistor electrode TE1 may be a drain electrode, and the second transistor electrode TE2 may be a source electrode. However, the present invention is not limited thereto.

The second interlayer insulating layer ILD2 may be located over the first transistor electrode TE1 and the second transistor electrode TE2 and on the first interlayer insulating layer ILD1. Like the first interlayer insulating layer ILD1 and the gate insulating layer GI, the second interlayer insulating layer ILD2 may include an inorganic material. For example, the inorganic material may include at least one of the materials exemplified as the material constituting the first interlayer insulating layer ILD1 and the gate insulating layer GI, e.g., silicon nitride ($SiN_x$), silicon oxide ($SiO_x$), silicon oxynitride ($SiO_xN_y$), and/or aluminum oxide ($AlO_x$).

The bridge pattern BRP may be disposed on the second interlayer insulating layer ILD2. The bridge pattern BRP may be connected to the first transistor electrode TE1 through a contact hole penetrating the second interlayer insulating layer ILD2. The bridge pattern BRP may be electrically connected to a first electrode ELT1 through the contact part CNT formed in the protective layer PSV. For example, the contact part CNT penetrates the protective layer PSV to be electrically connected to bridge pattern BRP.

The power line PL may be disposed on the second interlayer insulating layer ILD2. The power line PL may be electrically connected to a second electrode ELT2 through the other contact parts formed in the protective layer PSV.

The protective layer PSV may be located on the second interlayer insulating layer ILD2. The protective layer PSV may cover the bridge pattern BRP and the power line PL. The protective layer PSV may be provided in a form including an organic insulating layer, an inorganic insulating layer, or the organic insulating layer disposed on the inorganic insulating layer, but the present invention is not limited thereto. For example, the protective layer PSV may include a plurality of organic insulating layers and a plurality of inorganic insulating layers alternately stacked on each other. In accordance with an embodiment of the present inventive concept, the contact part CNT connected to one region of the bridge pattern BRP and the other contact part connected to one region of the power line PL may be formed in the protective layer PSV.

The display element layer DPL may be disposed on the pixel circuit layer PCL. The display element layer DPL may include a first electrode ELT1, the light emitting element LD, a pixel defining layer DPL, a second electrode ELT2, and a thin film encapsulation layer TFE.

In accordance with an embodiment of the present invention, the light emitting element LD may be disposed in a hole provided in the pixel defining layer PDL. In the hole of the pixel defining layer PDL, one surface of the light emitting element LD may be connected to the first electrode ELT1, which is exposed by the hole of the pixel defining layer PDL, and the other surface of the light emitting element LD may be connected to the second electrode ELT2.

The first electrode ELT1 may be an anode electrode of the light emitting element LD, and the second electrode ELT2 may be a common electrode (or a cathode electrode) of the light emitting element LD. In accordance with an embodiment of the present invention, the first electrode ELT1 and the second electrode ELT2 may include a conductive material. For example, the first electrode ELT1 may include a conductive material including reflexibility, and the second electrode ELT2 may include a transparent conductive material. However, the present invention is not limited thereto.

In accordance with an embodiment of the present invention, the light emitting element LD may have a multi-layered thin film structure including a light generation layer. The light emitting element LD may include a hole injection layer, a hole transport layer, a light generation layer, a hole blocking layer, an electron transport layer, and an electron injection layer. The hole injection layer is for injecting holes, and the hole transport layer is for increasing a hole recombination opportunity by suppressing movement of electrons, which are excellent in transportability of holes and are not combined in a light generation layer. The light generation layer is for emitting light by recombining the injected electrons and holes, and the hole blocking layer is for suppressing the movement of the holes that are not combined in the light generation layer. The electron transport layer is for smoothly transporting the electrons to the light generation layer, and the electron injection layer is for injecting the electrons. The light emitting element LD may emit light, based on an electrical signal provided from the first electrode ELT1 and the second electrode layer ELT2.

The pixel defining layer PDL may provide a position at which the light emitting element LD, which is implemented as the organic light emitting diode, is arranged. The pixel defining layer PDL may include an organic material. In an example, the pixel defining layer PDL may include at least one of acryl resin, epoxy resin, phenolic resin, polyamide resin, and/or polyimide resin, but the present invention is not limited thereto.

The thin film encapsulation layer TFE may be disposed on the second electrode ELT2. The thin film encapsulation layer TFE may prevent a step difference from being generated by the light emitting element LD and the pixel defining layer PDL. For example, the thin film encapsulation layer TFE may provide a substantially flat and even surface. The thin film encapsulation layer TFE may include a plurality of insulating layers covering the light emitting element LD. In an example, the thin film encapsulation layer TFE may have a structure in which an inorganic layer and an organic layer are alternately stacked.

Hereinafter, a manufacturing method of the collimator COL in accordance with an embodiment of the present invention will be described with reference to FIGS. 7 to 16. Descriptions of portion overlapping with those described above will be simplified or omitted to prevent redundant descriptions.

FIGS. 7 to 12 are process plan views illustrating a manufacturing method of a collimator in accordance with an embodiment of the present invention. FIGS. 13 to 16 are process plan views illustrating a manufacturing method of a collimator in accordance with an embodiment of the present invention.

FIGS. 7 to 12 illustrate a structure of the collimator COL described above with reference to FIG. 5. FIGS. 13 to 16 illustrate a structure of the collimator COL observed on a plane.

Figure 7:
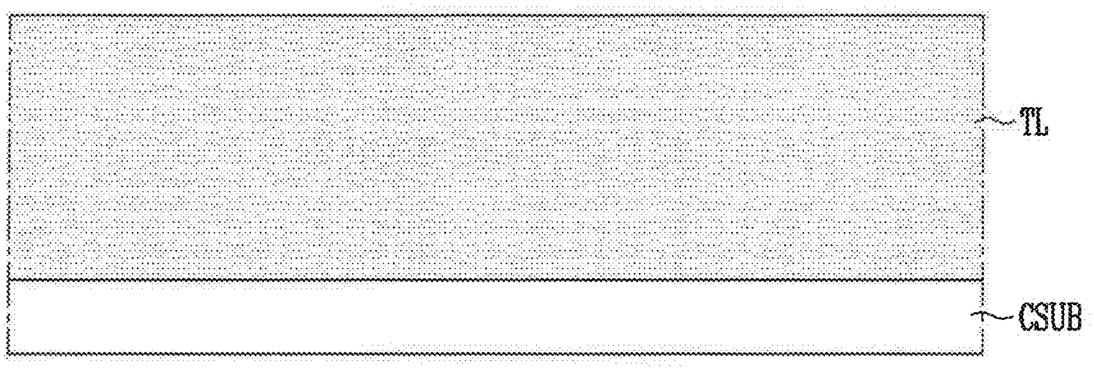
FIGS. 7, 8, 9, 10, 11 and 12 are process plan views illustrating a manufacturing method of a collimator in accordance with an embodiment of the present invention.

Referring to FIG. 7, a lower substrate CSUB may be provided (or prepared), and a base transmission layer TL may be disposed (or provided) on the lower substrate CSUB.

In this phase, the base transmission layer TL may be deposited (e.g., formed or coated) on lower substrate CSUB. The base transmission layer TL is a layer for providing a transmission pattern TP, and may include the material described above with reference to the transmission pattern TP.

In this phase, the base transmission layer TL may be deposited by using a method known in the art. For example, the base transmission layer TL may be formed through a chemical vapor deposition process, but the method is not necessarily limited to a specific process method.

In this phase, the lower substrate CSUB and the base transmission layer TL may be in contact with each other.

In this phase, the base transmission layer TL may be formed to have a thickness of about 10 μm or less. In accordance with an embodiment of the present invention, the base transmission layer TL may be formed to have a thickness of about 7 μm or less.

Figure 8:
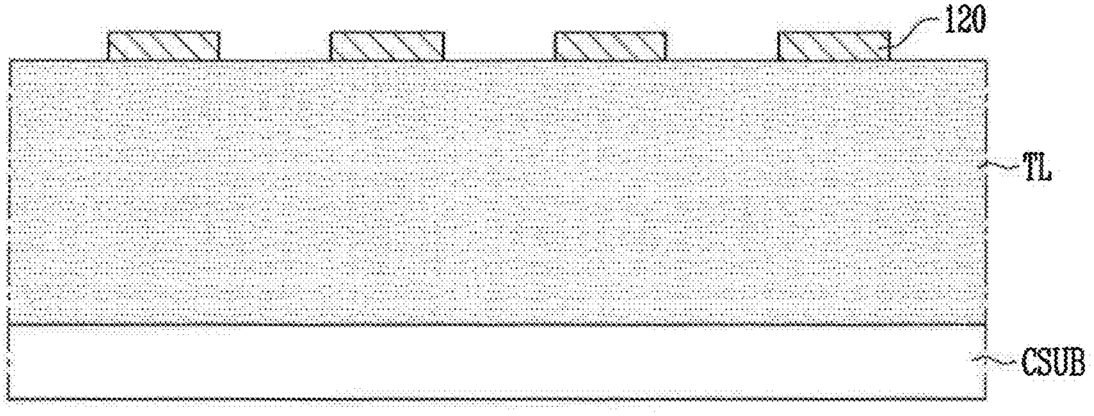
Figure 13:
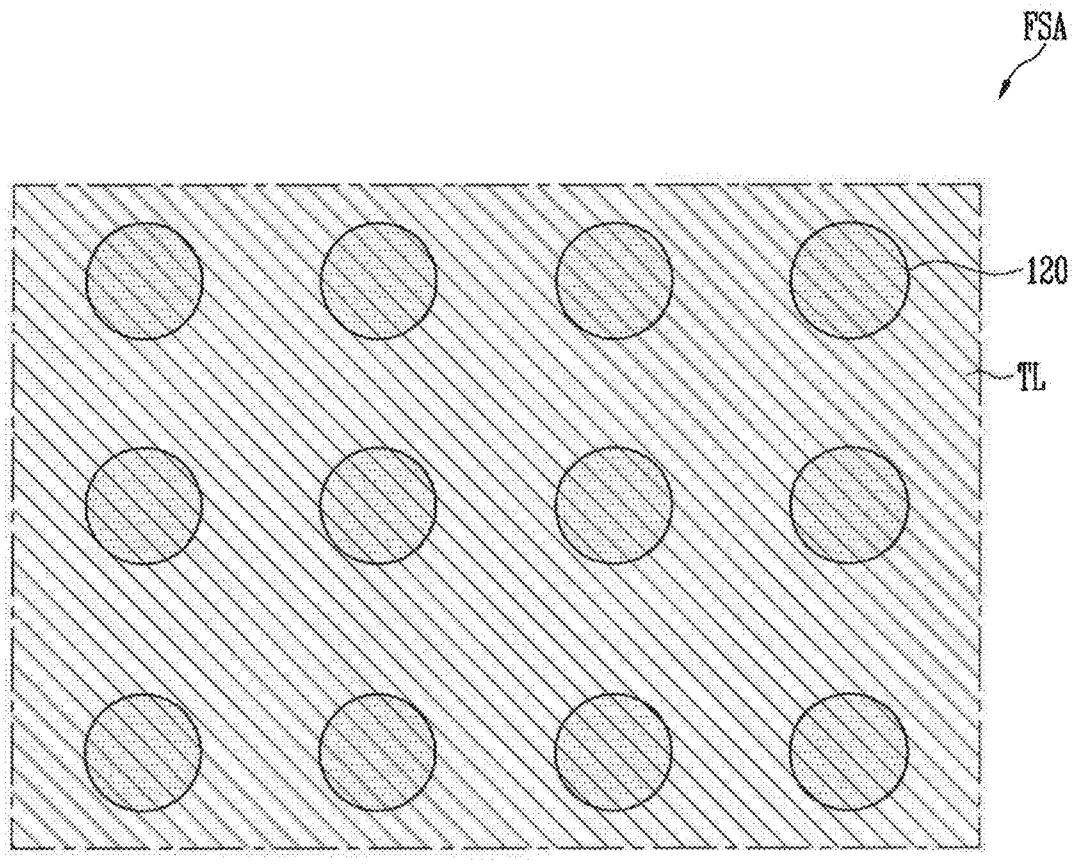
FIGS. 13, 14, 15 and 16 are process plan views illustrating a manufacturing method of a collimator in accordance with an embodiment of the present invention.

Referring to FIGS. 8 and 13, a transmission layer 120 may be disposed (or provided) on the base transmission layer TL.

In this phase, the transmission layer 120 may be disposed (or provided) at a position at which the transmission pattern TP is to be formed. The transmission layer 120 may be patterned (or provided) at a position at which the transmission pattern TP is to be provided. The transmission layer 120 may be disposed (or provided) at a position at which a transmission area TA is to be formed (or provided). As a subsequent process is performed (e.g., FIG. 9), the transmission layer 120 may overlap with the position at which the transmission pattern TP is provided, in a plan view.

In this phase, the transmission layer 120 and the base transmission layer TL may overlap with each other in a plan view.

In accordance with an embodiment of the present invention, the transmission layer 120 may be a mask for etching the base transmission layer TL. For example, the transmission layer 120 may be a hard mask used for dry etching.

Figure 9:
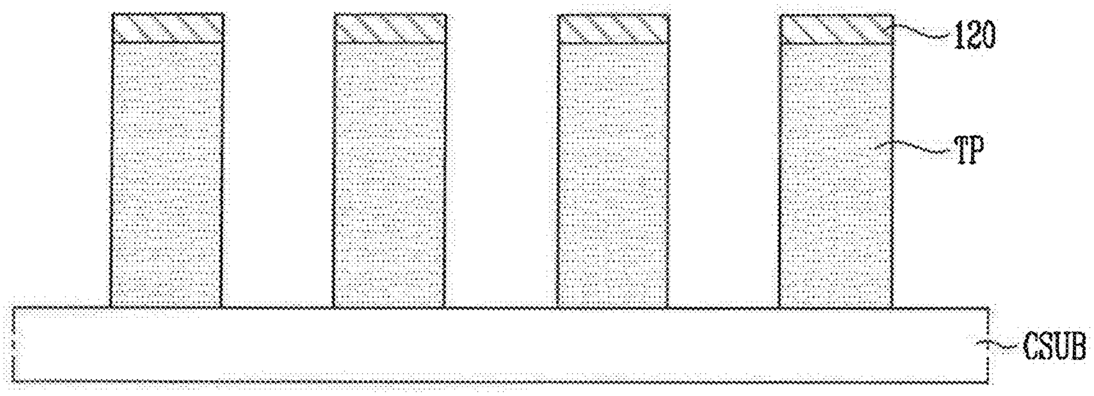
Figure 14:
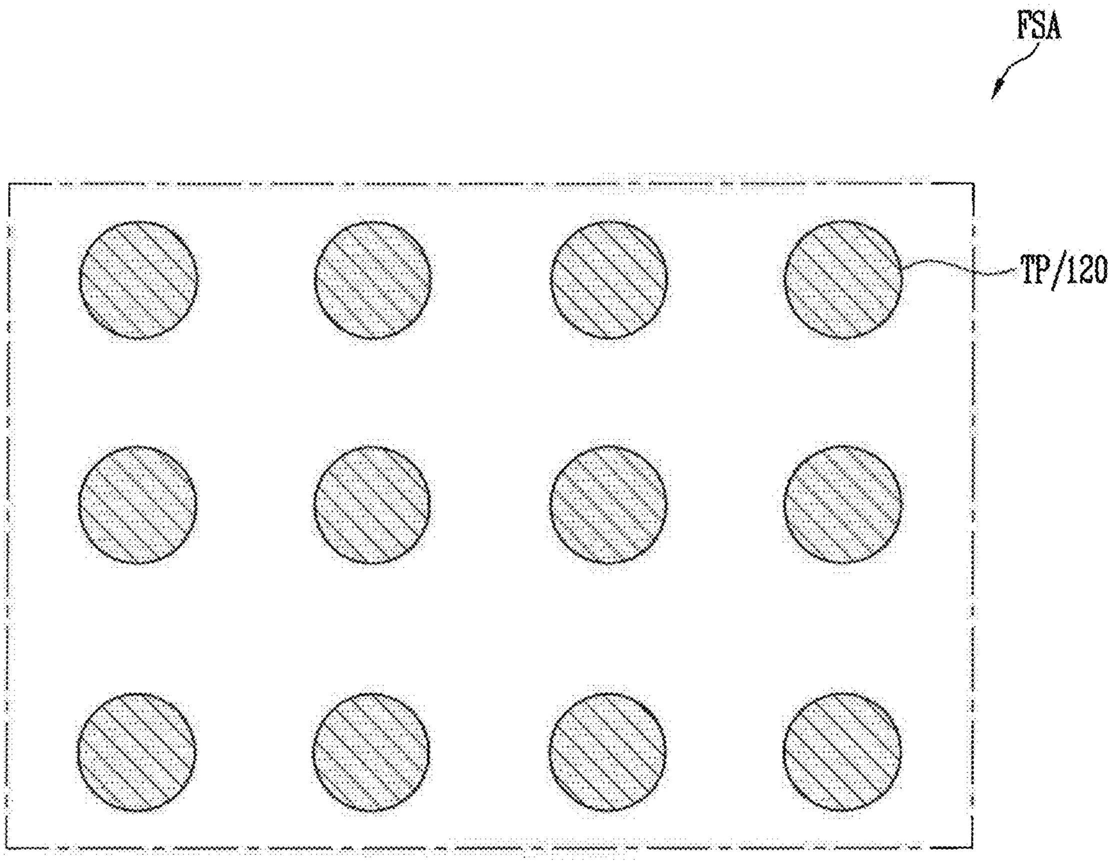

Referring to FIGS. 9 and 14, the base transmission layer TL may be etched by using the transmission layer 120 as an etching mask, and the transmission pattern TP may be provided (or formed).

In this phase, portions of the base transmission layer TL may be removed (or etched) in an area in which the transmission layer 120 is not disposed. The base transmission layer TL may be removed in the area in which the transmission layer 120 is not disposed, so that the lower substrate CSUB is exposed.

In this phase, at least a portion of an upper surface of the transmission pattern TP may be covered by the transmission layer 120, and at least a portion of a side surface of the transmission pattern TP may be exposed. Accordingly, transmission patterns TP patterned with a predetermined distance therebetween may be formed.

In this phase, an etching depth of the base transmission layer TL may be equal to a height of the transmission pattern TR For example, the etching depth of the base transmission layer TL may be about 10 μm or less. In addition, the etching depth of the base transmission layer TL may be about 7 μm or less.

In this phase, the patterning distances between the transmission patterns TP may be smaller than the etching depth of the base transmission layer TL. For example, the patterning distances between the transmission patterns TP may be about 5 μm or less.

Figure 10:
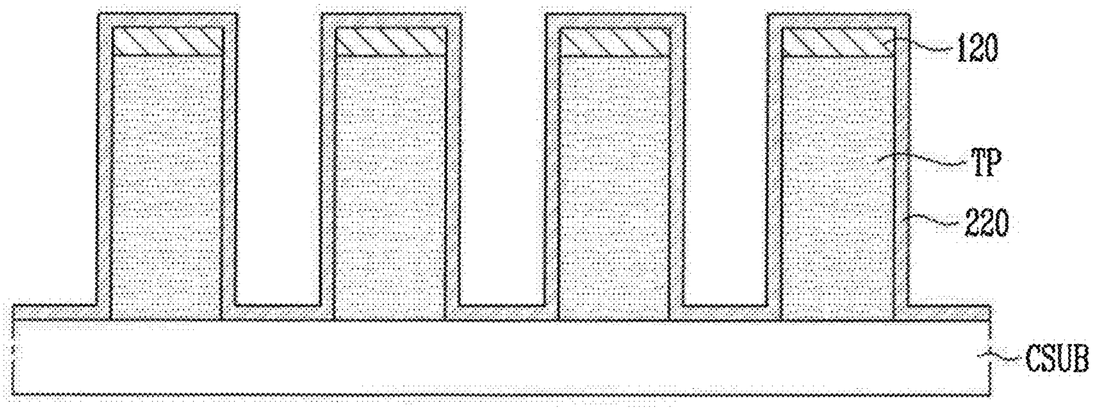
Figure 15:
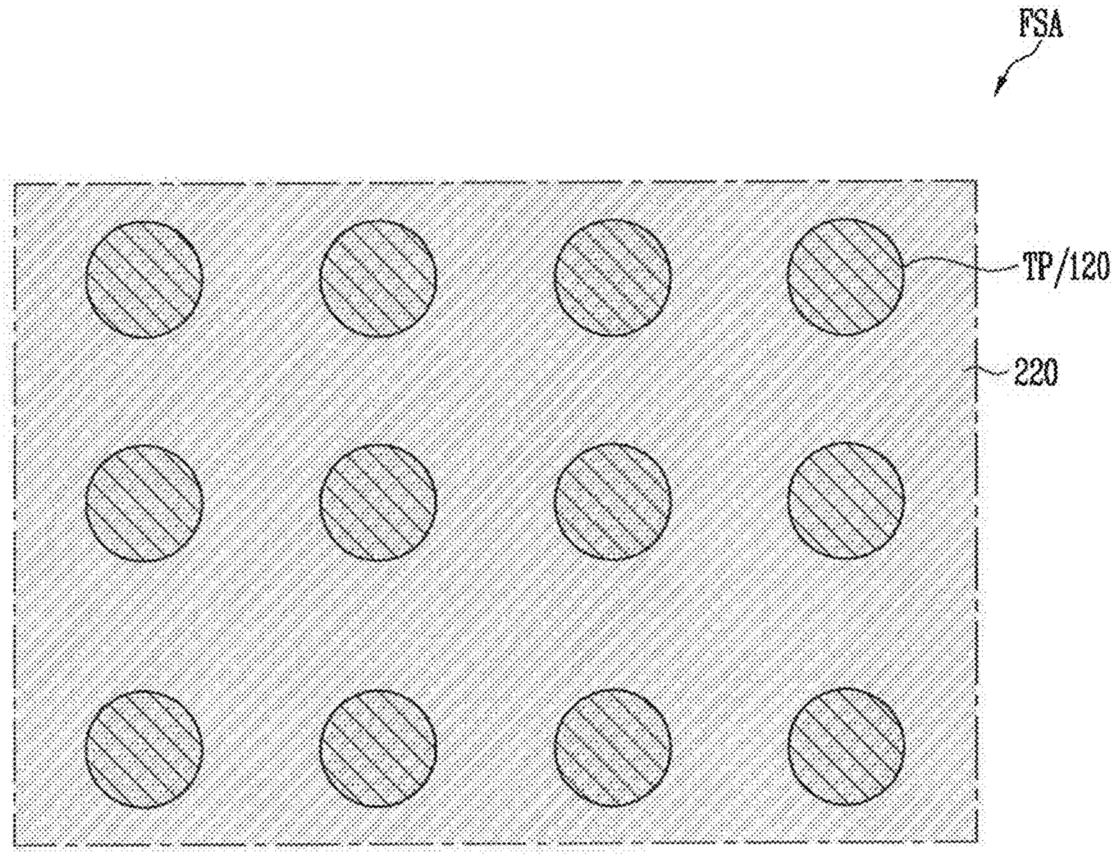

Referring to FIGS. 10 and 15, a base non-transmission layer 220 may be disposed (or provided) on the transmission patterns TP, the transmission layer 120 and the lower substrate CSUB.

For example, the base non-transmission layer 220 may be entirely deposited on the transmission patterns TP, the transmission layer 120, and the lower substrate CSUB. The base non-transmission layer 220 may be formed to cover the components (e.g., the transmission pattern TP and the transmission layer 120) formed in the above-described phase. For example, the base non-transmission layer 220 may be formed (or provided) on an outer surface of the transmission layer 120, the side surfaces of the transmission pattern TP, and one surface of the exposed lower substrate CSUB. For example, the base non-transmission layer 220 may be formed on an upper surface and side surfaces of the transmission layer 120.

In accordance with an embodiment of the present invention, in this phase, the base non-transmission layer 220, the transmission pattern TP, and the transmission layer 120 may overlap with each other in a plan view.

In this phase, the base non-transmission layer 220 may be deposited by using a method known in the art. For example, the base non-transmission layer 220 may be formed through a chemical vapor deposition process or physical vapor deposition process for depositing a metal, but the method is not necessarily limited to a specific process method.

In accordance with an embodiment of the present invention, the base non-transmission layer 220 may include a low reflective material (e.g., a low reflective metal material) as a material which does not allow light to substantially be transmitted therethrough as described above with reference to the non-transmission layer 240.

Figure 11:
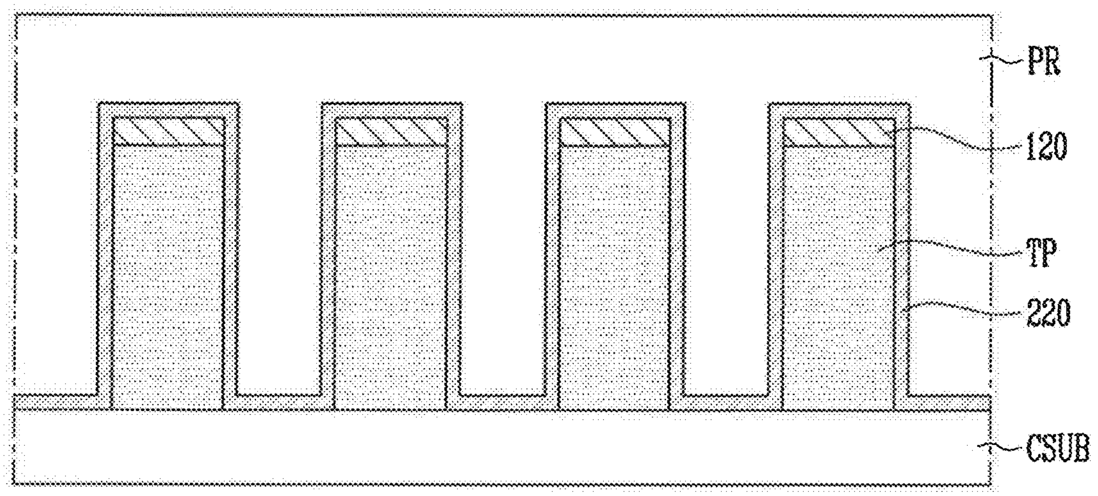

Referring to FIG. 11, a photoresist layer PR may be formed (or provided). In accordance with an embodiment, the photoresist layer PR may include a photosensitive material. For example, the photoresist layer PR may include a positive photoresist. In some embodiments, the photoresist layer PR may include a negative photoresist. However, hereinafter, for convenience of description, a case where the photoresist layer PR includes the positive photoresist will be mainly described.

In this phase, the photoresist layer PR may be entirely disposed (or coated). Accordingly, the photoresist layer PR may be disposed on the base non-transmission layer 220, to cover the base non-transmission layer 220.

Figure 12:
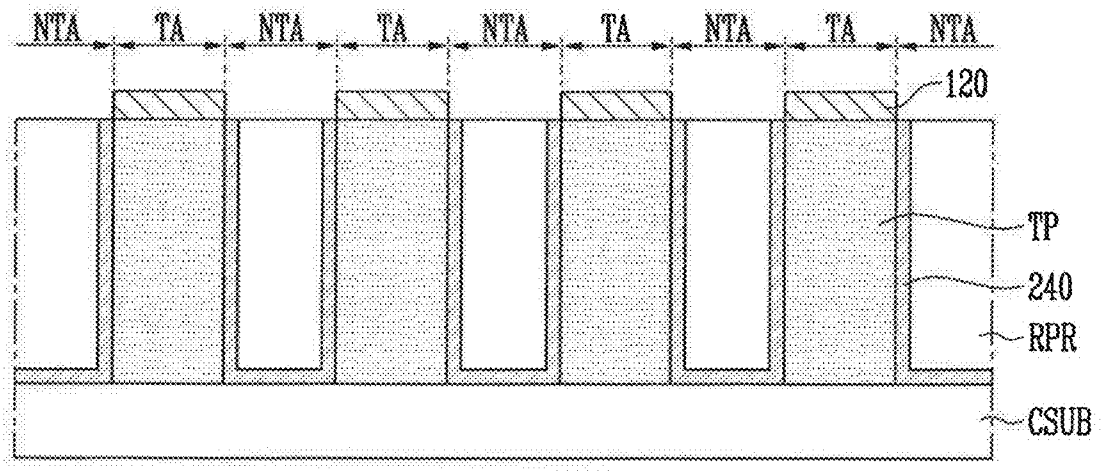
Figure 16:
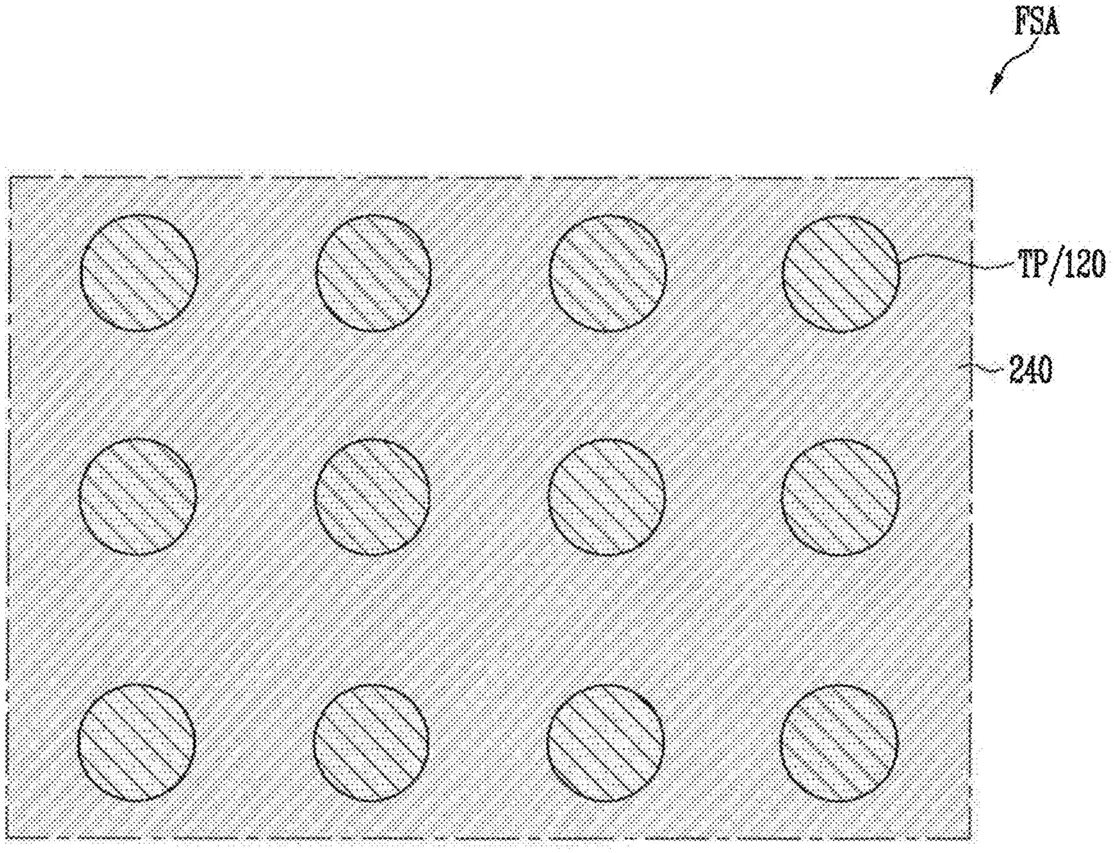

Referring to FIGS. 12 and 16, the base non-transmission layer 220 may be etched, and a non-transmission layer 240 may be provided.

In this phase, a mask for etching the non-transmission layer 220 may be provided by patterning the above-described photoresist layer PR, and the base non-transmission layer 220 may be etched by using the provided mask. For example, the photoresist layer PR may be patterned to form the mask for etching the non-transmission layer 220. At least a portion of the photoresist layer PR may be provided as a remaining photoresist layer RPR, and another portion of the photoresist layer PR may be provided as a hard mask for etching the base non-transmission layer 220.

In accordance with an embodiment of the present invention, when the photoresist layer PR is patterned, the remaining photoresist layer RPR (or a layer corresponding thereto) might not be removed. For example, in a state in which at least a portion of the photoresist layer PR is provided between the transmission patterns TP, at least another portion of the photoresist layer PR may be removed.

In this phase, the outer surface of the transmission layer 120 may be exposed. For example, a portion of the base non-transmission layer 220 disposed on the outer surface of the transmission layer 120 may be removed, so that the outer surface of the transmission layer 120 is exposed.

In this phase, a process of etching the base non-transmission layer 220 may be performed until the remaining photoresist layer RPR remains.

In this phase, the base non-transmission layer 220 disposed on the side surfaces of the transmission pattern TP might not be removed.

In accordance with an embodiment of the present invention, the remaining photoresist layer RPR may be disposed between the transmission patterns TP, to cover side surfaces of the transmission patterns TP, while exposing the transmission layer 120. Accordingly, the side surfaces of the transmission patterns TP might not be exposed by the remaining photoresist layer RPR.

In accordance with an embodiment of the present invention, in a state in which the remaining photoresist layer RPR is still provided on the lower substrate CSUB, an etching process on the base non-transmission layer 220 may be performed, so that damage to the transmission pattern TP can be prevented. For example, an optical pattern of the collimator COL may be formed through subsequent processes according to a uniform, intended or predetermined pattern, so that the reliability of an optical path of the collimator COL can be increased.

In this phase, the etching process on the base non-transmission layer 220 may be performed until the transmission layer 120 is exposed. As described above, the transmission layer 120 may cover one surface of the transmission pattern TR For example, the etching process on the base non-transmission layer 220 is performed until the transmission layer 120 is still provided, so that damage to the transmission pattern TP may be prevented.

In addition, in this phase, a transmission area TA and a non-transmission area NTA may be provided. For example, an area overlapping with the transmission pattern TP, which is an area where the base non-transmission layer 220 is etched, may be provided as the transmission area TA. Since an area, in which the base non-transmission layer 220 is not etched, does not function as a path through which light is movable, the area may be provided as the non-transmission area NTA. For example, the etching process of the base non-transmission layer 220 includes the forming of the transmission area TA and the non-transmission area NTA.

In accordance with an embodiment of the present invention, an etching process for providing the non-transmission layer 240 may be performed by using an apparatus for providing (e.g., forming or patterning) an individual component of the pixel circuit layer PCL or the display element layer DPL of the display device DD. For example, a patterning apparatus for etching the base non-transmission layer 220 may be identical to an apparatus used to provide metal layers (e.g., the first transistor electrode TE1, the second transistor electrode TE2, the bridge pattern BRP, and the like) of the pixel circuit layer PCL. Thus, any separate apparatus might not be required to pattern the base non-transmission layer 240, and accordingly, process cost can be reduced.

Subsequently, the remaining photoresist layer RPR may be removed, so that the collimator COL may be formed in accordance with the above-described embodiment (e.g., FIG. 5). In accordance with an embodiment of the present invention, the remaining photoresist layer RPR may be removed through a stripping process. In an embodiment of the present invention, the transmission layer 120 is not separately removed but may be selectively removed.

In accordance with the present invention, there can be provided a collimator, a manufacturing method thereof, and a display device including the collimator, which can prevent distortion of optical information of a fingerprint and reduce processing costs.

While the present invention has been particularly shown and described with reference to embodiments thereof, it will be apparent those of ordinary skill in the art that various changes in form and detail may be made thereto without departing from spirit and scope of the present invention.

What is claimed is:

1. A collimator comprising:

a transmission area and a non-transmission area;

a transmission pattern transmitting light; and a non-transmission layer disposed on at least one side surface of the transmission pattern, wherein:

the transmission pattern overlaps with the transmission area, and does not overlap with the non-transmission area, the transmission area includes a first transmission area and a second transmission area spaced apart in a horizontal direction, and the transmission pattern comprises a first transmission pattern in the first transmission area and a second transmission pattern in the second transmission area, the non-transmission layer includes a first portion formed on a first side surface of the first transmission pattern, a second portion formed on a second side surface of the second transmission pattern, and a third portion connecting the first portion and the second portion, the first portion and the second portion are physically spaced apart from each other in the horizontal direction, the non-transmission layer includes a low reflective metal material, the first portion has a first surface in contact with the first transmission pattern and a second surface, opposite to the first surface, that is exposed to an exterior of the collimator, and the second portion has a first surface in contact with the second transmission pattern and a second surface, opposite to the first surface, that is exposed to an exterior of the collimator.

2. The collimator of claim 1, further comprising:

a transmission layer disposed on the transmission pattern, wherein:

the transmission layer has a uniform thickness throughout its entirety, the transmission layer includes at least one of indium tin oxide, indium zinc oxide, and indium tin zinc oxide, and the transmission layer has a same size and shape as each of the first transmission pattern and the second transmission pattern in a plan view.

3. The collimator of claim 2, wherein:

the non-transmission layer does not overlap with the transmission area, and overlaps with the non-transmission area, and the transmission layer defines the transmission area in the plan view.

4. The collimator of claim 3, further comprising:

a lower substrate on which the transmission pattern and the non-transmission layer are disposed, wherein:

the lower substrate and the non-transmission layer are in contact with each other in the non-transmission area, the lower substrate is optically transparent, and the third portion contacts the lower substrate.

5. The collimator of claim 3, wherein the transmission pattern includes a transparent organic material.

6. The collimator of claim 1, wherein the non-transmission layer has a reflectivity of about 20% or less.

7. The collimator of claim 1, wherein the non-transmission layer includes at least one of molybdenum tantalum oxide or molybdenum oxide.

8. An electronic device comprising:

a fingerprint sensing panel acquiring fingerprint information of a user's touch input; and a display panel including a light emitting element emitting light, wherein the fingerprint sensing panel includes:

the collimator of claim 1; and a sensor layer including sensors sensing light passing through the collimator, and wherein the non-transmission layer includes a low reflective metal material.

9. The electronic device of claim 8, wherein the user's touch input is provided on a first surface of the display panel, and the fingerprint sensing panel is disposed on a second surface of the display panel, and the collimator is disposed between the display panel and the sensor layer.

10. The electronic device of claim 8, wherein the transmission pattern provides a path for light proceeding to the sensor layer.

11. An electronic device comprising:

a fingerprint sensing panel, wherein the fingerprint sensing panel includes:

the collimator of claim 1; and a sensor layer acquiring information based on received light passing through the collimator.

12. The collimator of claim 4, wherein:

the lower substrate and the non-transmission layer are in direct contact with each other throughout the non-transmission area, a thickness of the non-transmission layer in a thickness direction of the collimator is less than a thickness of the transmission pattern in the thickness direction of the collimator, and portions of an upper surface of the non-transmission layer are disposed closer to the lower substrate than to an upper surface of the transmission pattern.

13. A collimator comprising:

a transmission pattern transmitting light;

a non-transmission layer disposed on at least one side surface of the transmission pattern; and a transmission layer disposed on the transmission pattern, wherein:

the non-transmission layer includes a low reflective metal material, the transmission layer having a planar upper surface, the transmission layer having a uniform thickness throughout its entirety, the collimator comprises a transmission area and a non-transmission area, the transmission pattern overlaps with the transmission area, and does not overlap with the non-transmission area, and the transmission layer includes at least one of indium tin oxide, indium zinc oxide, and indium tin zinc oxide.

14. The collimator of claim 13, wherein sidewalls of the transmission layer are exposed to an exterior of the collimator.

15. The collimator of claim 14, wherein;

the non-transmission layer does not overlap with the transmission area, and overlaps with the non-transmission area, and the transmission layer has a peripheral perimeter that coincides with a peripheral perimeter of the transmission pattern in a plan view.

16. The collimator of claim 15, further comprising a lower substrate on which the transmission pattern and the non-transmission layer are disposed, wherein:

the lower substrate and the non-transmission layer are in contact with each other in the non-transmission area, and the lower substrate is optically transparent.

17. The collimator of claim 15, wherein the transmission pattern includes a transparent organic material.

18. The collimator of claim 13, wherein the non-transmission layer has a reflectivity of about 20% or less.

19. The collimator of claim 13, wherein the non-transmission layer includes at least one of molybdenum tantalum oxide or molybdenum oxide.

20. The collimator of claim 16, wherein:

the lower substrate and the non-transmission layer are in direct contact with each other throughout the non-transmission area, a thickness of the non-transmission layer in a thickness direction of the collimator is less than a thickness of the transmission pattern in the thickness direction of the collimator, and portions of an upper surface of the non-transmission layer are disposed closer to the lower substrate than to an upper surface of the transmission pattern.

* * * * *